(12) United States Patent
Owens, Jr.

(10) Patent No.: US 6,267,060 B1
(45) Date of Patent: Jul. 31, 2001

(54) OVERHEAD CONVEYOR WITH POWERED DRIVE MODULE

(75) Inventor: Donald E. Owens, Jr., Mason, OH (US)

(73) Assignee: OCS-Intellitrak, Inc., Cincinnati, OH (US)

( * ) Notice: Subject to any disclaimer, the term of this patent is extended or adjusted under 35 U.S.C. 154(b) by 0 days.

(21) Appl. No.: 09/223,011

(22) Filed: Dec. 30, 1998

(51) Int. Cl.[7] .................................................... B61B 13/00
(52) U.S. Cl. ........................ 104/166; 104/167; 104/168; 198/465.4; 198/687.1
(58) Field of Search .................. 104/89, 165–168; 198/465.1, 465.2, 465.3, 465.4, 678.1, 687.1, 834, 835; 414/155

(56) References Cited

U.S. PATENT DOCUMENTS

| | | |
|---|---|---|
| 3,164,104 | 1/1965 | Hunt . |
| 3,850,280 | 11/1974 | Ohrnell . |
| 4,203,511 | 5/1980 | Uhing . |
| 5,154,275 * | 10/1992 | Speckhart et al. ................ 198/465.4 |
| 5,335,781 * | 8/1994 | Miyagawa et al. .................. 198/834 |
| 5,785,168 | 7/1998 | Beall, Jr. .............................. 104/166 |
| 5,806,655 | 9/1998 | Tabler ................................. 104/166 |
| 6,032,785 * | 3/2000 | Beall, Jr. ............................. 104/166 |

* cited by examiner

Primary Examiner—S. Joseph Morano
Assistant Examiner—Lars A. Olson
(74) Attorney, Agent, or Firm—Thomas E. Beall, Jr.

(57) ABSTRACT

A factory preassembled drive module is assembled between opposed spaced apart ends of load beams and opposed rotatable shafts supported by the load beams are assembled drivingly to a rotatable drive shaft coupling of the drive unit or module in a job site where the overhead conveyor is installed. The drive unit module includes a motor driving a transmission, in turn driving pulleys that drive belts in turn driving the rotatable portion of the drive shaft coupling. The drive motor and transmission are mounted on a bracket with lost motion permitting tension adjustment of the belts, and the bracket is formed with flanges to respectively abut and overlap correspondingly shaped portions of the adjacent load beams for connection thereto.

29 Claims, 4 Drawing Sheets

OVERHEAD CONVEYOR WITH POWERED DRIVE MODULE

BACKGROUND OF THE INVENTION

The present invention relates to overhead conveyors of the type disclosed in U.S. Pat. No. 5,806,655 issued Sep. 15, 1998 to Tabler, in U.S. Pat. No. 5,785,168 issued Jul. 28, 1998 to Beall, Jr., in U.S. Pat. No. 4,203,511 issued May 20, 1980 to Uhing, in U.S. Pat. No. 3,164,104 issued Jan. 5, 1965 to Hunt, and in U.S. Pat. No. 3,850,280 issued Nov. 26, 1974 to Ohrnell.

In this type of overhead conveyer, one or a plurality of aligned rotatable shafts extend along the conveying path, and skewed rollers contact the upper portion of such shafts to be driven linearly along the path as the shafts rotate, with the rollers carrying a depending carriage for supporting the conveyed objects or loads. One or more powered drive units are arranged along the conveying path to drivingly rotate the shaft or shafts. This type of conveyor is specifically designed for a particular environment, and therefore the location and number of drive units, as well as the spacing therebetween, varies according to the conveyor environment. A considerable amount of installation time is taken on site in assembling and mounting the drive units and in replacing them should a drive unit fail.

SUMMARY OF THE INVENTION

It is the object of the present invention to provide an overhead conveyor system wherein the drive unit or units are mounted in an expeditious manner to save initial installation cost and operating cost in replacing or repairing the drive units, and to provide uniformity in assembly of the drive unit.

Particularly, each of the present invention drive units is a preassembled module and identical to other drive units, regardless of the conveyor environment. Each drive unit module includes a motor, possibly a transmission driven by the motor, a rotatable drive shaft coupling, and a rotatable power connection, such as a V-belt, between the transmission or motor output and the rotatable drive shaft coupling. The motor and transmission are adjustably mounted, for tensioning the belt, on a bracket that is coupled to two distal spaced apart ends of adjacent load beam channels. The load beam channels support rotatable drive shafts by a plurality of bearings between the load beam channels and rotatable drive shafts. In this manner, the belt extends through the gap between the adjacent channels, and the drive module is hung from and fully supported by the channels, without requiring any other specific mounting of the drive unit.

This not only makes initial installation convenient, quick and less expensive as compared with conventional installation, it also allows for quick and easy removal and replacement of the drive unit as a module for repair purposes and reconfiguration of the overhead conveyor system. Further, the preassembly of the drive unit at a factory provides better quality control of belt tension etc. than can be obtained when assembly of a drive unit is on site, as in the prior art.

BRIEF DESCRIPTION OF THE DRAWINGS

Further objects, features and advantages of the present invention will become more clear from the following detailed description of a preferred embodiment, shown in the accompanying drawing, wherein.

DETAILED DESCRIPTION OF THE INVENTION

Figure 1:
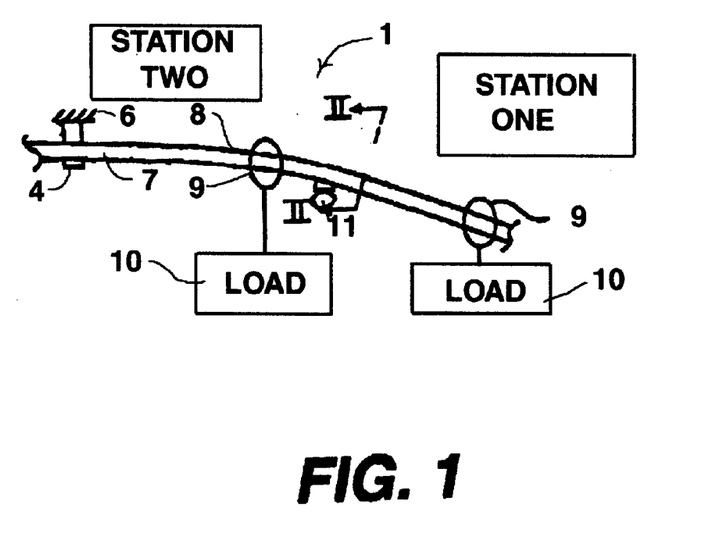
FIG. 1 is a schematic elevational view of an overhead conveyer system layout.
Figure 2:
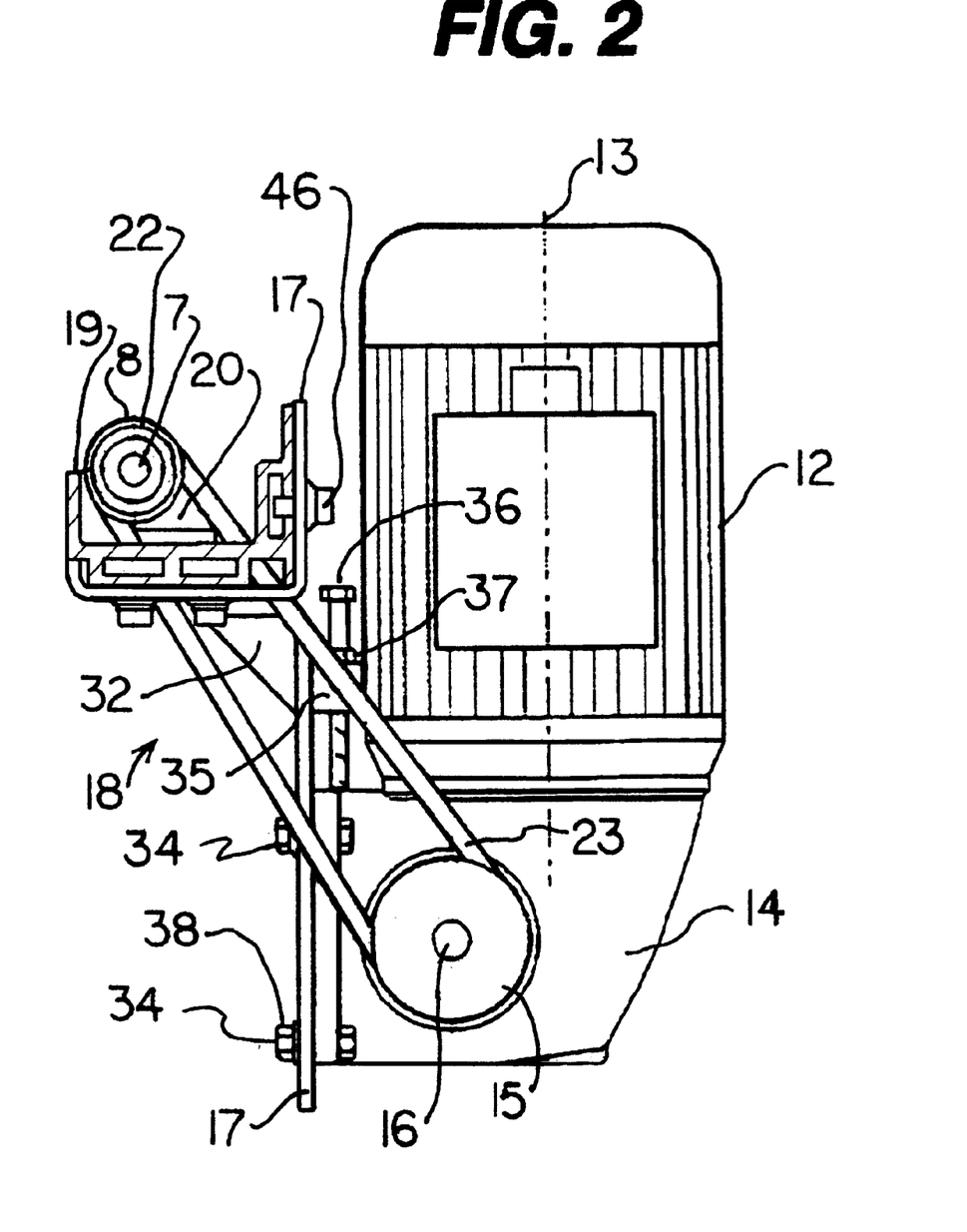
FIG. 2 is a cross-sectional elevational view of the powered overhead conveyer taken on line II—II of FIG. 1 to show the mounting of the modular drive unit of the present invention.

As schematically shown in FIG. 1, the powered overhead conveyor system 1 of the present invention extends between STATION ONE and STATION TWO, which may be picking or loading stations of a distribution system, work stations of an assembly plant, processing stations, for example, spraying and drying of a process plant, and the like as examples of a multi-station environment. A stationary frame 4 is mounted to a ceiling 6 for rotatably supporting a drive shaft 7 having a top surface portion 8 for engaging and driving a carriage 9 that supports a load 10. A drive module or unit 11 rotatably drives the shaft 7 about its axis to move the carriages 9 along the length of the shaft 7, which length extends in the direction of the conveying path. In FIG. 2, extending substantially along the entire transporting path, the stationary frame 4 may be attached by bolts to the factory ceiling 6, factory wall, or factory floor, for example.

In FIG. 2, conventional drive motor 12 having a drive shaft (not shown) along axis 13 is mounted on a standard mechanical transmission 14. The transmission 14 has a power input (not shown) drivingly coupled to the drive shaft of the drive motor 12, and further has a rotational power output including belt drive pulleys 15 rotatable about axis 16. While an electric motor 12 is provided in the preferred embodiment, the drive motor may be hydraulic, pneumatic, or like rotational type power supply, or a linear type motor according to the broader aspects of the present invention. Preferably, the mechanical transmission 14 is a worm gear speed reduction unit, but this mechanical transmission, according to the broader aspects of the invention, may consist of a single shaft coupling to the motor if gear reduction is not needed.

The motor 12 is securely fastened to the top of the mechanical transmission 14 for its sole support, which mechanical transmission 14 is in turn mounted on a bracket 17, which bracket 17 provides the sole support for the transmission.

A load beam, preferably an extruded aluminum channel 19, is bolted, for example by means of bolts 20, to the frame 4. The channel 19 is preferably sufficiently rigid for its function, but also may be bendable along the transporting path as shown in FIG. 1, which path may be curved. The channel 19 comprises a plurality of aligned and identical cross-sectionally shaped extruded aluminum channel sections having outwardly facing keyhole shaped slots to provide for mounting of the channel to vertical and horizontal surfaces with T-bolts, as well as inwardly facing keyhole shaped slots for the mounting of a plurality of bearing blocks 20 with T-bolts at spaced locations along the transporting path. The bearing blocks 20 do not in any way encumber or overlap the topmost portion 8 of the periphery of the drive shaft 7, which is rotatably supported by the bearing blocks 20 in the channel 19.

The drive shaft 7 is made up of a plurality of drivingly continuous or discontinuous sections (discontinuous for different speeds, e.g.), with each section being supported by a plurality of bearings within respective bearing blocks 20 and being driven by a separate drive unit that is a combination of electric motor 12, mechanical transmission 14, drive shaft coupling 29 and power connection 18. The power connection 18 includes a belt 23, which can be any type of endless flexible link, extending from the pulley 15, which is a part of the power connection, through an aperture 21 (see FIG. 5) within the bracket 17 to a drive pulley 22, which is a part of the power connection, that drives the drive shaft 7. The power connection endless flexible link 23 may be a standard V-belt as shown, a chain, a toothed belt, or the like. The pulleys 15, 22 have a structure complimentary to the link 23. The power connection link, specifically belt 23, does not extend upwardly beyond the peripheral portion 8 and preferably is cylindrically coextensive at the top with the drive shaft to engage the driven wheel 24. The drive shaft 7 is preferably a hollow, cylindrical aluminum shaft having an outer cylindrical surface, and the curved sections if used are preferably flexible elastomeric cylindrical shafts of the same diameter with the same cylindrical outer periphery or interdigitated segments (not shown), for example.

Figure 3:
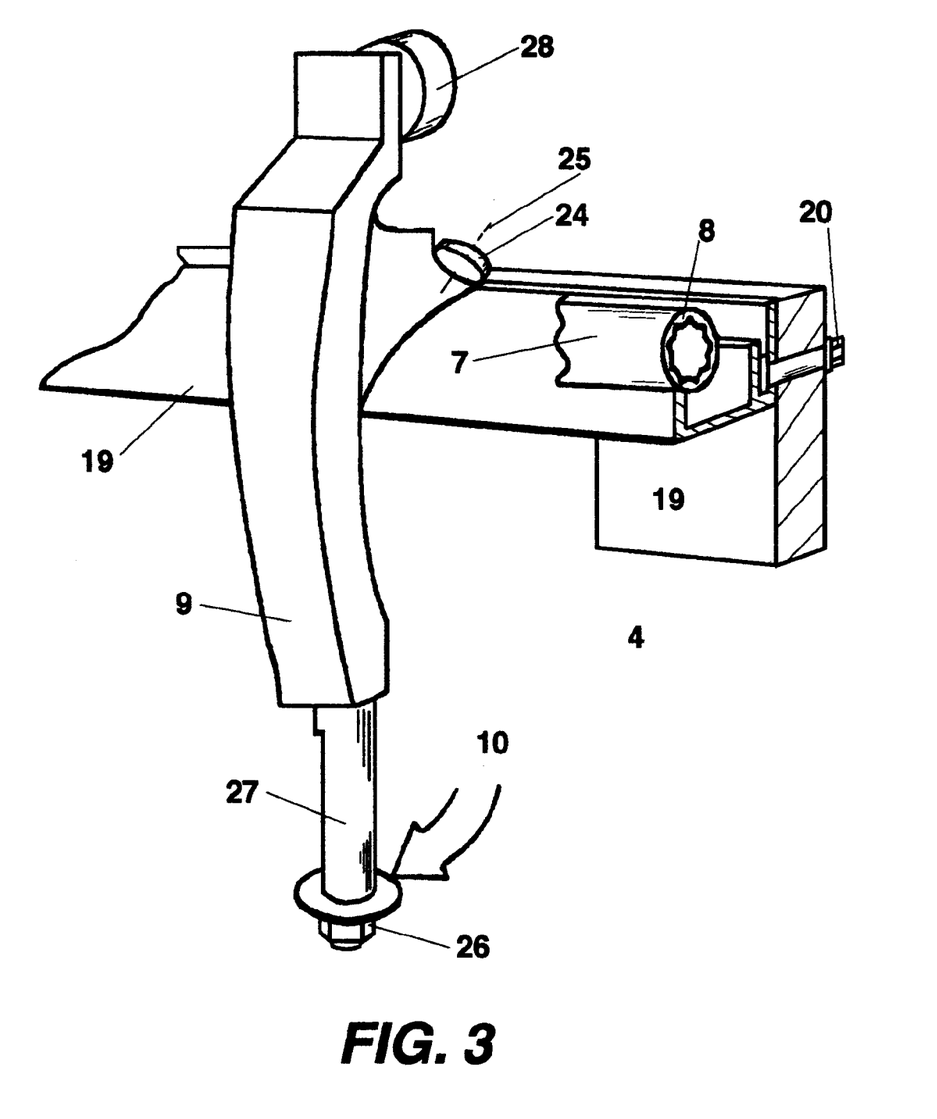
FIG. 3 is a partial perspective view of a portion of the powered overhead conveyer shown in FIG. 1 and FIG. 2.

To convert the rotary driven motion of the shaft 7, which shaft has a shaft axis extending along the transporting path direction, into a linear motion along the direction of the transporting path, at least one or two and most preferably four driven wheels 24 (not shown in detail but disclosed in the above mentioned patents, and one being shown in FIG. 3) engage the topmost periphery or free periphery of the shaft 7. Each of these driven wheels 24 is mounted for rotation about a driven wheel axis 25 that is non-parallel to the drive shaft axis and non-perpendicular to the drive shaft axis, preferably being at an acute angle thereto; the angle being selected according to desired linear speed and linear force along the conveying path. The driven wheels 24 are preferably divided into two sets (not shown), with each set having their axes of rotation being within a non-vertical, non-horizontal plane that is parallel (tangent) to the drive shaft axis, with the planes intersecting each other. Thereby, when the drive shaft 7 rotates, the driven wheels 24 engage the drive shaft 7 to form a helical loci of engagement about the periphery of the drive shaft 7 so as to linearly power the driven wheels 24 along the transporting path in a direction of the transporting path that depends upon the direction of rotation of the drive shaft 7, in a manner analogous to a worm gear or threaded-type engagement. In fact, according to broader aspects of the present invention, the drive shaft may be a worm gear or threaded shaft and the driven wheels may be a fixed driven element or driven wheels that extend within or interengage with the worm gear or the threaded shaft.

The driven wheels 24 are rotatably mounted on a carriage 9 as shown in any of the above mentioned patents, e.g. The channel 19, bearing blocks with bearings 20, drive 12, 14, carriage 9, frame 4 and drive shaft 7 are conventional and will not be described in further detail, since they are described in the above patents and known in the field.

As shown in FIG. 3, weight of the load 10, secured by a nut 26 on a depending stud 27 of the carriage 9, and weight of carriage 9 is carried through the driven wheels 24 to the drive shaft 7. The carriage may carry automatically readable address coding (not shown).

In a known manner, a support wheel 28, rotatably mounted, is used by transfers (not shown) and supports the carriage 9 and load 10 on a fixed drag rail (not shown) as an alternative to using the drive shaft 7, e.g., in a buffer.

Figure 4:
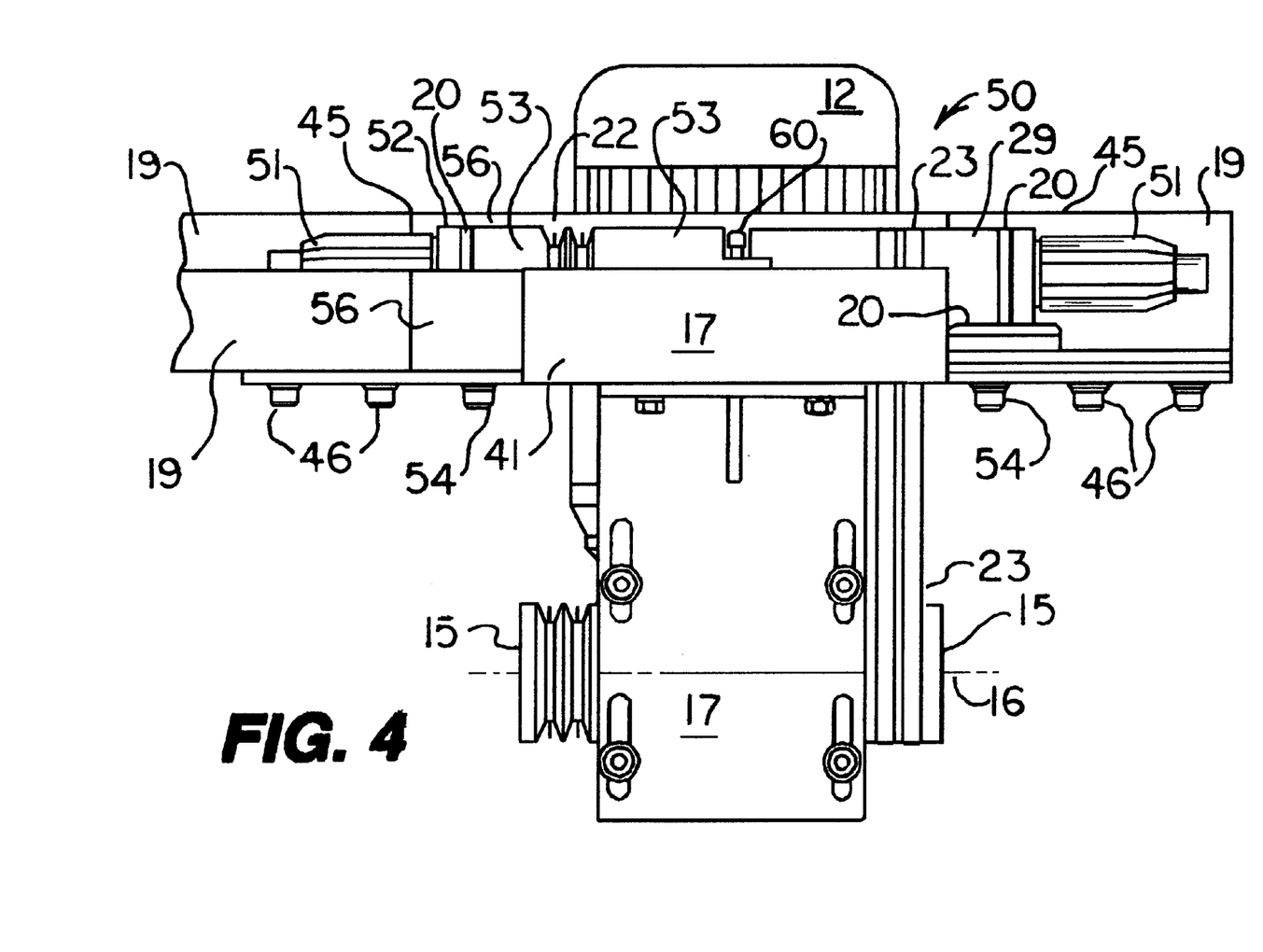
FIG. 4 is an elevational view of the powered overhead conveyer taken from the left side of FIG. 2.
Figure 5:
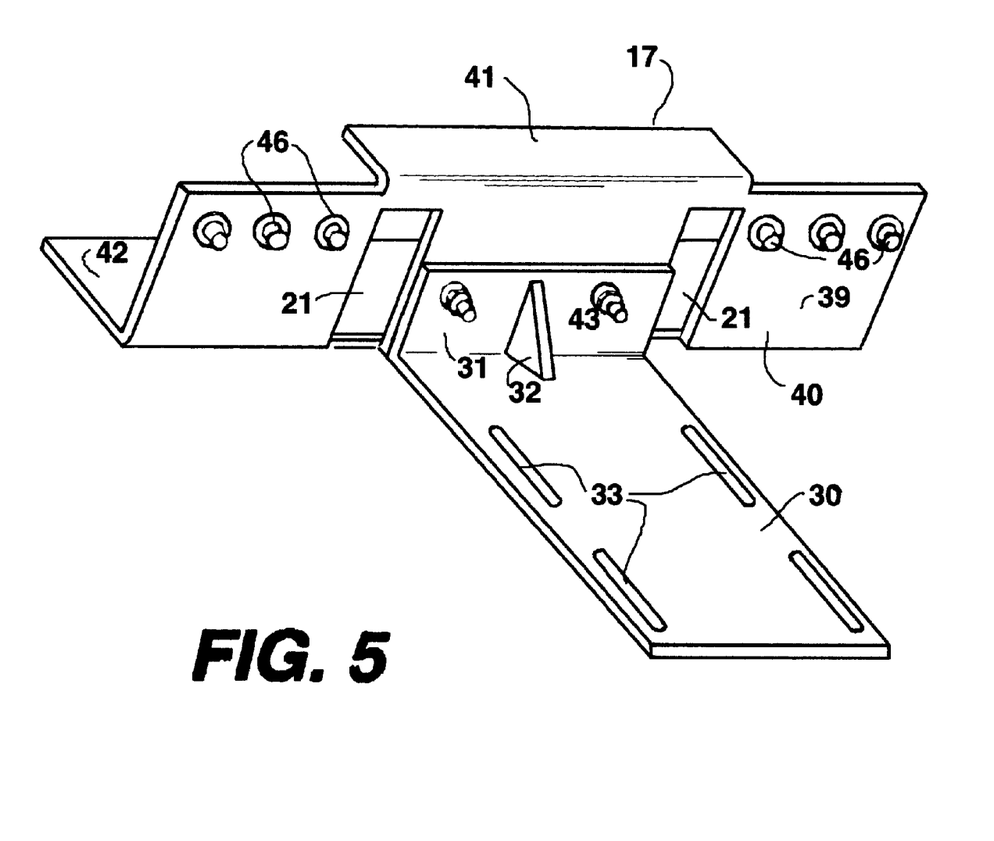
FIG. 5 is a perspective view of a bracket of the drive unit.

The novel portion of the overhead conveyor system, according to the present invention, is primarily shown in FIGS. 2, 4 and 5.

The drive unit of the present invention is modular, meaning herein that as an entirety, it can be preassembled, that is completely assembled apart from a job site, for example at a central location for the conveyor manufacturer. The preassembled drive module can then be easily and quickly installed at a job site to thereby save critical on-site installation time, particularly when it is realized that many drive units are contained along the length of large conveying systems. Further, if a drive unit, which contains movable parts and electrical components does fail during operation, it is easy for maintenance people at the job site and employed by the owners and users of the conveyor, to quickly remove the drive module, without otherwise disturbing any components of the conveying system, particularly without requiring any disassembly or movement of the adjacent channels 19, adjacent drive shafts 7, and adjacent fixed mountings of the drive channels to the frame 4. In fact, such drive units as modules completely preassembled can be stored on-site by the user of the conveyor for emergency use. The preassembly of the drive unit at the factory assures uniform, accurate and reliable tensioning of the belts 23. These functions will flow from the following described structure.

In the embodiment, the drive module comprises the motor 12, the transmission 14, the drive connection 15, 23, 22, the bracket 17 mounting the motor, transmission on the channels or load beams 17, and a drive shaft coupling 29, which are preassembled into the modular construction, as now to be described. The bracket 17 has a first part of bent plate steel or the like metal, which includes a depending motor/transmission mounting portion 30 that extends vertically and a horizontal connecting portion 31, with a welded flange 32 functioning as a brace.

The mounting portion 30 has a plurality of through mounting slots 33, four in the illustration, which as shown in FIG. 2 received therethrough the shafts of mounting bolts 34. On the far side of the mounting portion 30 and therefore not visible in FIG. 5, a boss is welded to the mounting portion 30, which boss 35 is visible in FIG. 2. The boss 35 has a threaded vertical aperture, receiving a long adjusting bolt 36, which can be threaded downward against the mounting flange of the transmission 14, to move the transmission 14 and motor 12 downwardly as the bolts 34 provide a lost motion connection in the elongated slots 33, to adjust the tension within the belts 23. After the tension within the belts 23 has been sufficiently adjusted, a lock nut 37 secures the bolt 36 in its adjusted position, and nuts 38 are tightened on the mounting bolts 34 to secure the transmission 14 and the motor 12 carried thereby in their adjusted position. This adjustment is preferably a part of the factory preassembly, but may be quickly and easily done on the job site, and may further be accomplished as a part of regular maintenance during operation of the conveyor over a long period of time if the belts tend to loosen.

As seen in FIG. 4, there are two pulleys 15 axially aligned with respect to axis 16 of the transmission 14, and respectively on opposite sides of the transmission 14. Each of these pulleys 15 is a double V-groove pulley, receiving therein a respective V-belt 23, so that there are four V-belts 23 for each of the drive units or drive modules. Correspondingly, there are two pulleys 22 having together four pulley grooves. According to FIG. 5, a second bent sheet metal plate 39 has a horizontal portion 40, a front flange 41 that extends vertically, extends for only a distance B (not shown) that is the central one-half of the length as measured in the direction of the conveying path, and a rear flange 42. The rear flange 42 extends vertically higher, as seen in FIG. 4, than the front flange 41 and further extends for the entire length, a distance A (not shown) of the second plate 39. The mounting portion 30 and the second plate 39 have two aligned apertures receiving therein bolt and nut sets 43, to rigidly secure them together. This connection may also be welded, if desired. The horizontal portion 40 of the second plate 39 has the spaced apertures 21, referred to above, for passing therethrough the belts 23.

To form a gap or mounting area for the drive module, the conventional channels, two in number, are rigidly mounted by means of suitable bearing blocks 20 to the frame 4 as seen in FIG. 1, but not shown in FIGS. 2 and 4, so that the adjacent distal ends of such axially spaced apart channels 19 form a gap of the fixed distance C (not shown) between points 45 in FIG. 4, which points 45 respectively define the distal ends of the two channels 19 shown in FIG. 4. Distance C being less than distance A and more than distance B. From FIGS. 2, 4 and 5, it is seen that the bracket 17 can be dropped in from above so that the opposite end portions, portion 40 and flange 42 of the second metal plate 39 overlap the adjacent channels 19 to receive bolts 46. The vertical flange 41 is spaced from and axially aligned with corresponding front flange of the channel 19 to form two groups each of distance 0.5 (C-B). These two groups are filed by aligned, short length 0.5 (C-B), sections of channel 56 for a purpose to be described later. Short channels 56 are cut from other channels 19. The bottom of the channel 19 rests on top of the horizontal plate 40, and the rear vertical flange of the channel 19 having its rearmost surface touching the frontmost surface of the rear flange 42. Suitable bolt and nut/washer combinations 46 are used to releasably, securely and rigidly secure such overlapping portions together. In this manner, motor 12 is solely supported by the transmission 14, which in turn is solely supported by the bracket 17, and the bracket 17 is solely supported by the adjacent channels. There is no direct connection between the bracket 17 and the frame 4, but rather the weight of the drive module is carried by the channels 19, which weight is then transferred to frame 4 at a location remote from that shown in FIG. 4.

The drive module 17 extends between two axially aligned and spaced apart drive shafts 7, which drive shafts are not shown in FIG. 4, but which have distal ends and extend toward each other slightly further than the points 45. After the drive module has been rigidly bolted to the channels 19, as set forth above, a drive shaft coupling 50, to be described, that was pre-installed on the drive module is used to drivingly interconnect the adjacent drive shafts to provide a rotating cylindrical extension thereof, which extension includes the pulleys 22 and outer surface of the belts 23, but not bearings 20. The drive shafts 7 are assembled axially onto the drive shaft coupling after the drive module is so installed.

As seen in FIG. 3, each drive shaft is tubular and has an interior periphery that is provided with interior splines. Opposite ends of the drive shaft coupling 50 have exterior splines 51, which drivingly interengage, telescopically, within the tubular drive shafts 7. A rotatable knurled cylinder 52 extends concentric with and radially out from the portion of the shaft that has the splines 51 and is rotatably connected therewith. The outer diameter of the knurled portion 52 is identical to the outer diameter of the shafts 7, and the distal end of the adjacent shaft 7 basically abuts or is slightly spaced from knurled portion 52. Adjacent the knurled portion 52, toward the center of the drive shaft coupling, is the bearing 20, with an outer stationary semi-cylindrical surface being shown in FIG. 4; even though this surface is stationary, it will not interfere with the drive of the carriages, because the driven roller 24 is either wide enough or there are several driven rollers 24 axially spaced from each other for each carriage, so that the carriage is always in driving contact with an upward portion 8 of the shaft 7 or a corresponding rotating cylindrical portion of the drive shaft coupling, which would be the knurled cylinder 52 or rotatable cylindrical central portion 53 of the drive shaft coupling.

As seen for the right-most one of the two bearings 20 shown in FIG. 4, the stationary portion of the bearing extends down to a mounting flange and threadingly receives a bolt 54 to secure the bearing block of the bearing.

When two adjacent drive shafts 7 are to be connected drivingly together without any drive module therebetween, which structure is conventional but not shown in the drawings, a different conventional drive shaft coupling is employed. The conventional drive shaft coupling has two mirror image portions: the rightmost portion is identical to the rightmost portion of the present invention drive shaft coupling from bearing 20 to the right as seen, in FIG. 4, and the leftmost portion of the conventional drive shaft coupling would be identical to the leftmost portion of the present invention drive shaft coupling shown to the left of the leftmost bearing 20, in FIG. 4. The convention drive shaft coupling would include only a single bearing with bearing block 20.

Two of the conventional drive shaft couplings (modified) are employed, together with other structure to be described, in forming the drive shaft coupling 50 of the present invention. These two conventional drive shaft couplings are each modified by removing one of two aligned sleeves forming splines 51 to leave cylindrical metal shaft, which shaft (without the sleeves) extends inwardly from the bearings 20 in FIG. 4, where they are not seen since they are telescopically pressfit within a machined hole of a solid metal shaft forming the central portion 53. This solid metal shaft for the central portion 53 is first machined by drilling central axial holes in its opposite ends to telescopically receive therein the above-mentioned shafts with a pressfit driving interengagement, the central portion shaft is then machined at four places on its exterior surface to respectively form the pulleys 22. Next the solid shaft, of diameter equal to the exterior diameter of the drive shaft 7, is centrally cut and machined so as to provide two axially overlapping semi-cylindrical portions at the center of the central portion 53, which overlapping portions are then drilled perpendicular to the axis of the drive shafts 7, for receiving therethrough a roll pin or the like to form the rigid central portion 53. The drive shaft coupling So is preassembled and mounted by T-bolts on the channel portions 56 that in turn are secured to the bracket at the factory, not the job site, to be a part of the preassembled drive module.

The drive shaft coupling is basically formed of two identical mirror image parts, which can be disassembled by removing the roll pin at the job site, for maintenance. After the maintenance is performed, e.g. a changing of the belts 23, the two parts are separately inserted within the adjacent ends of the drive shafts 7 in the axial direction, respectively, with no axial movement of the drive shafts; the previously mentioned bolt 54 is then assembled to secure the bearing block and drive shaft coupling as a whole in position. During this operation the parts of the drive shaft coupling are rotated to assemble the overlapping portions, and drive shafts are sufficiently flexible but they may be slightly bent or distorted to facilitate such an assembly. Thereafter, the roller pin 60 is inserted to complete the rigid connection of the drive shaft coupling parts. The aforementioned tensioning of the belts is accomplished to complete the assembly.

While a preferred embodiment of the present invention has been described in detail, with variations and modifications, further embodiments, variations and modifications are contemplated within the broader aspects of the present invention, in addition to the advantageous details, in accordance with the spirit and scope of the following claims.

What is claimed is:

1. An overhead conveyor system, comprising:
   a plurality of carriages for suspending loads;
   an overhead powered conveyor for suspending said carriages and transporting said carriages serially along at least one conveying path;
   a stationary frame extending along said conveying path;
   said overhead powered conveyor having at least one drive having a rotational power output;
   said overhead powered conveyor having first and second drive shafts with spaced apart aligned distal ends and extending along said conveying path;
   each of said drive shafts being mounted to said stationary frame for rotation about respective shaft axes parallel to respective portions of said conveying path;
   said overhead powered conveyor having a power connection between said drive and said drive shafts for rotatably-driving said drive shafts about said shaft axes;
   said carriages each having a driven wheel rotatable about a driven wheel axis nonparallel and non-perpendicular to said shaft axis, and said driven wheel engaging an engagement portion of said drive shafts with sufficient traction so as to form a helical loci of engagement about the periphery of said drive shafts during rotation of said drive shafts about said shaft axis to power said carriages along the conveying path in a direction of the conveying path dependent upon a direction of rotation of said drive shafts;
   said carriages suspending the loads vertically below said drive shafts;
   wherein the mounting of each of said drive shafts to said stationary frame includes two aligned load beams extending along the conveying path and being fixedly connected to said stationary frame, and a plurality of bearings mounted on said load beams rotatably supporting each of said drive shafts;
   said load beams having spaced apart, aligned and adjacent distal ends respectively adjacent the distal ends of said drive shafts;
   said power connection including a drive shaft coupling drivingly extending between said drive shaft distal ends and having opposed ends respectively being connected to said distal ends of said drive shafts;
   a bracket mounting said drive, said bracket extending between and being connected to said distal ends of said load beams below and adjacent to said drive shaft coupling;
   each of said drive shafts is cylindrical with a cylindrical periphery;
   said drive shaft coupling having a pulley;
   said power connection including a pulley on said rotational power output of said drive and a flexible endless link drivingly extending around said pulleys; and
   wherein said link together with said pulley of said drive shaft coupling forms an extension of said cylindrical outer periphery of said drive shafts at least for an engagement portion for receiving thereon said driven wheel.

2. A system according to claim 1, wherein said bracket has an aperture therein passing said link.

3. A system according to claim 2, wherein said bracket forms the sole support for said drive and said bracket being solely supported by the distal ends of said channels.

4. An overhead conveyor system, comprising:
   a plurality of carriages for suspending loads;
   an overhead powered conveyor for suspending said carriages and transporting said carriages serially alone at least one conveying path;
   a stationary frame extending along said conveying path;
   said overhead powered conveyor having at least one drive having a rotational power output;
   said overhead powered conveyor having first and second drive shafts with spaced apart aligned distal ends and extending alone said conveying path;
   each of said drive shafts being mounted to said stationary frame for rotation about respective shaft axes parallel to respective portions of said conveying path;
   said overhead powered conveyor having a power connection between said drive and said drive shafts for rotatably-driving said drive shafts about said shaft axes;
   said carriages each having a driven wheel rotatable about a driven wheel axis nonparallel and non-perpendicular to said shaft axis, and said driven wheel engaging an engagement portion of said drive shafts with sufficient traction so as to form a helical loci of engagement about the periphery of said drive shafts during rotation of said drive shafts about said shaft axis to power said carriages alone the conveying path in a direction of the conveying path dependent upon a direction of rotation of said drive shafts;
   said carriages suspending the loads vertically below said drive shafts;
   wherein the mounting of each of said drive shafts to said stationary frame includes two aligned load beams extending along the conveying path and being fixedly connected to said stationary frame, and a plurality of bearings mounted on said load beams rotatably supporting each of said drive shafts;
   said load beams having spaced apart, aligned and adjacent distal ends respectively adjacent the distal ends of said drive shafts;
   said power connection including a drive shaft coupling drivingly extending between said drive shaft distal ends and having opposed ends respectively being connected to said distal ends of said drive shafts; and
   a bracket mounting said drive, said bracket extending between and being connected to said distal ends of said load beams below and adjacent to said drive shaft coupling;
   said drive shafts being of uniform tubular construction throughout their length with a cylindrical outer periphery; and
   wherein said opposed ends of said drive shaft coupling are telescopically received within respective ones of said distal ends of said drive shafts, and said drive shaft coupling has a cylindrical periphery central portion forming an extension of the cylindrical outer periphery of said drive shafts for rotation therewith.

5. A system according to claim 4, wherein said drive shaft coupling has a pulley; and
   said power connection including a pulley on said rotational power output of said drive and a flexible endless link drivingly extending around said pulleys.

6. A system according to claim 5, wherein said link together with said pulley of said drive shaft coupling forms an extension of said cylindrical outer periphery of said central portion of said drive shaft coupling at least for a top portion for receiving thereon said driven wheel.

7. A system according to claim 6, wherein said link is a belt.

8. A system according to claim 7, wherein each of said load beams is an upwardly opening channel having a substantially identical cross-sectional shape throughout its entire length.

9. A system according to claim 8, wherein said bracket forms the sole support for said drive and said bracket being solely supported by the distal ends of said channels.

10. An overhead conveyor system, comprising:
   a plurality of carriages for suspending loads;
   an overhead powered conveyor for suspending said carriage transporting said carriages serially along at least one conveying path;
   a stationary frame extending along said conveying path;
   said overhead powered conveyor having at least one drive having a rotational power output;
   said overhead powered conveyor having first and second drive shafts with spaced apart aligned distal ends and extending along said conveying path;
   each of said drive shafts being mounted to said stationary frame for rotation about respective shaft axes parallel to respective portions of said conveying path;
   said overhead powered conveyor having a power connection between said drive and said drive shafts for rotatably-driving said drive shafts about said shaft axes;
   said carriages each having a driven wheel rotatable about a driven wheel axis nonparallel and non-perpendicular to said shaft axis, and said driven wheel engaging an engagement portion of said drive shafts with sufficient traction so as to form a helical loci of engagement about the periphery of said drive shafts during rotation of said drive shafts about said shaft axis to power said carriages along the conveying path in a direction of the conveying path dependent upon a direction of rotation of said drive shafts;
   said carriages suspending the loads vertically below said drive shafts;
   wherein the mounting of each of said drive shafts to said stationary frame includes two aligned load beams extending along the conveying path and being fixedly connected to said stationary frame, and a plurality of bearings mounted on said load beams rotatably supporting each of said drive shafts;
   said load beams having spaced apart, aligned and adjacent distal ends respectively adjacent the distal ends of said drive shafts;
   said power connection including a drive shaft coupling drivingly extending between said drive shaft distal ends and having opposed ends respectively being connected to said distal ends of said drive shafts; and
   a bracket mounting said drive, said bracket extending between and being connected to said distal ends of said load beams below and adjacent to said drive shaft coupling; and
   said bracket forming the sole support for said drive and said bracket being solely supported by the distal ends of said channels.

11. A system according to claim 10, wherein each of said drive shafts is cylindrical with a cylindrical periphery.

12. An overhead conveyor system, comprising:
   a plurality of carriages for suspending loads;
   an overhead powered conveyor for suspending said carriages and transporting said carriages serially along at least one conveying path;
   a stationary frame extending along said conveying path;
   said overhead powered conveyor having at least one drive having a rotational power output;
   said overhead powered conveyor having first and second drive shafts with spaced apart aligned distal ends and extending alone said conveying path;
   each of said drive shafts being mounted to said stationary frame for rotation about respective shaft axes parallel to respective portions of said conveying path;
   said overhead powered conveyor having a power connection between said drive and said drive shafts for rotatably-driving said drive shafts about said shaft axes;
   said carriages each having a driven wheel rotatable about a driven wheel axis nonparallel and non-perpendicular to said shaft axis, and said driven wheel engaging an engagement portion of said drive shafts with sufficient traction so as to form a helical loci of engagement about the periphery of said drive shafts during rotation of said drive shafts about said shaft axis to power said carriages along the conveying path in a direction of the conveying path dependent upon a direction of rotation of said drive shafts;
   said carriages suspending the loads vertically below said drive shafts;
   wherein the mounting of each of said drive shafts to said stationary frame includes two aligned load beams extending along the conveying path and being fixedly connected to said stationary frame, and a plurality of bearings mounted on said load beams rotatably supporting each of said drive shafts;
   said load beams having spaced apart, aligned and adjacent distal ends respectively adjacent the distal ends of said drive shafts;
   said power connection including a drive shaft coupling driving extending between said drive shaft distal ends and having opposed ends respectively being connected to said distal ends of said drive shafts;
   a bracket mounting said drive, said bracket extending between and being connected to said distal ends of said load beams below and adjacent to said drive shaft coupling;
   said power connection having a flexible endless link;
   said bracket including a lost motion adjustable connection with said drive for adjusting tension within said link; and
   said bracket including a threaded member threadingly movable against said drive in a direction perpendicular to the conveying path for said adjusting.

13. A system according to claim 12, wherein said link is a belt and wherein said bracket has an aperture therein passing said link.

14. A system according to claim 12, wherein said drive shafts are of uniform tubular construction throughout their length with a cylindrical outer periphery;
   wherein said opposed ends of said drive shaft coupling are telescopically received within respective ones of said distal ends of said drive shafts, and said drive shaft coupling has a cylindrical periphery central portion forming an extension of the cylindrical outer periphery of said drive shafts for rotation therewith;

wherein said drive shaft coupling has a pulley;

said power connection including a pulley on said rotational power output of said drive and a flexible endless link drivingly extending around said pulleys;

wherein said link together with said pulley of said drive shaft coupling forms an extension of said cylindrical outer periphery of said central portion of said drive shaft coupling at least for a top portion for receiving thereon said driven wheel;

wherein each of said load beams is an upwardly opening channel having a substantially identical cross-sectional shape throughout its entire length; and wherein said bracket forms the sole support for said drive and said bracket being solely supported by the distal ends of said channels.

15. A system according to claim 14, wherein said link is a belt having an outer surface that forms an extension of said cylindrical outer periphery of said central portion of said drive shaft coupling at least for a top portion for receiving thereon said driven wheel.

16. An overhead conveyor system, comprising:

a plurality of carriages for suspending loads;

an overhead powered conveyor for suspending said carriages and transporting said carriages serially along at least one conveying path;

a stationary frame extending along said conveying path;

said overhead powered conveyor having at least one drive having a rotational power output;

said overhead powered conveyor having first and second drive shafts with spaced apart aligned distal ends and extending alone said conveying path;

each of said drive shafts being mounted to said stationary frame for rotation about respective shaft axes parallel to respective portions of said conveying-path;

said overhead powered conveyor having a power connection between said drive and said drive shafts for rotatably-driving said drive shafts about said shaft axes;

said carriages each having a driven wheel rotatable about a driven wheel axis nonparallel and non-perpendicular to said shaft axis, and said driven wheel engaging an engagement portion of said drive shafts with sufficient traction so as to form a helical loci of engagement about the periphery of said drive shafts during rotation of said drive shafts about said shaft axis to power said carriages along the conveying path in a direction of the conveying path dependent upon a direction of rotation of said drive shafts;

said carriages suspending the loads vertically below said drive shafts;

wherein the mounting of each of said drive shafts to said stationary frame includes two aligned load beams extending alone the conveying path and being fixedly connected to said stationary frame, and a plurality of bearings mounted on said load beams rotatably supporting each of said drive shafts;

said load beams having spaced apart, aligned and adjacent distal ends respectively adjacent the distal ends of said drive shafts;

said power connection including a drive shaft coupling drivingly extending between said drive shaft distal ends and having opposed ends respectively being connected to said distal ends of said drive shafts;

a bracket mounting said drive, said bracket extending between and being connected to said distal ends of said load beams below and adjacent to said drive shaft coupling;

said bracket forming the sole support for said drive and said bracket being solely supported by the distal ends of said load beams;

at least one bearing rotatably mounting said drive shaft coupling on said bracket; and said drive shaft coupling, at least one si bearing, said bracket, said drive, and said power connection form a preassembled drive unit that is fully preassembled independently of said drive shafts and said load beams as a module drive unit.

17. A system according to claim 16, wherein there are two bearings rotatably supporting said drive shaft coupling on said bracket and being spaced apart in the direction of said conveying path.

18. A system according to claim 16, wherein said drive shaft coupling is centrally split into two identical, mirror images when assembled, coupling parts aligned with each other in the direction of said conveying path;

said drive shaft coupling including a releasable fastener joining said coupling parts together so that said coupling parts may be disassembled and moved from said drive shafts without axially moving said drive shafts; and said bracket being releasably connected to said load beams so that said bracket may be removed from between said load beams without moving said load beams; and said modular drive unit as an entirety can be unfastened, removed and replaced without moving or disassembling said drive shafts and said load beams.

19. A system according to claim 18, wherein said drive shafts are of uniform tubular construction throughout their length with a cylindrical outer periphery; and wherein said drive shaft coupling includes opposite ends telescopically received within respective drive shafts, and a cylindrical periphery central portion forming an extension of the cylindrical outer periphery of said drive shafts for rotation therewith.

20. A system according to claim 19, wherein said power connection includes spaced apart pulleys on said drive shaft coupling for driving said drive shaft coupling and in turn driving said drive shafts;

said power connection further having two pulleys respectively on opposite sides of said drive and each connected to said power output, and two endless flexible links extending between said pulleys respectively on said drive and said drive shaft coupling;

wherein there are two bearings rotatably supporting said drive shaft coupling on said bracket and being spaced apart in the direction of said conveying path;

said bracket having spaced apart apertures respectively passing therethrough said flexible endless links;

wherein each of said load beams is an upwardly opening channel having a substantially identical cross-sectional shape throughout its entire length; and wherein said bracket has an aperture therein passing said link.

21. A system according to claim 20, wherein said bracket includes a lost motion adjustable connection with said drive for adjusting tension within said links;

said bracket including a threaded member threadingly movable against said drive in a direction perpendicular to the conveying path for said adjusting; and wherein each of said links is a belt having an outer surface that forms an extension of said cylindrical outer periphery of said central portion of said drive shaft coupling at least for a top portion for receiving thereon said driven wheel.

22. A system according to claim 16, wherein said power connection includes two spaced apart pulleys on said drive shaft coupling for driving said drive shaft coupling and in turn driving said drive shafts;

said power connection further having two pulleys respectively on opposite sides of said drive and each connected to said power output, and two endless flexible links extending between said pulleys respectively on said drive and said drive shaft coupling;

wherein there are two bearings rotatably supporting said drive shaft coupling on said bracket and being spaced apart in the direction of said conveying path; and said bracket having spaced apart apertures respectively passing therethrough said flexible endless links.

said drive shaft coupling including a releasable fastener joining said coupling parts together so that said coupling parts may be disassembled and moved from said drive shafts without axially moving said drive shafts; and said bracket being releasably connected to said load beams so that said bracket may be removed from between said load beams without moving said load beams; and said modular drive unit as an entirety can be unfastened, removed and replaced without moving or disassembling said drive shafts and said load beams.

23. A system according to claim 22, wherein said drive shaft coupling is centrally split into two identical, mirror images when assembled, coupling parts aligned with each other in the direction of said conveying path;

said drive shaft coupling including a releasable fastener joining said coupling parts together so that said coupling parts may be disassembled and moved from said drive shafts without axially moving said drive shafts; and said bracket being releasably connected to said load beams so that said bracket may be removed from between said load beams without moving said load beams; and said modular drive unit as an entirety can be unfastened, removed and replaced without moving or disassembling said drive shafts and said load beams.

24. An overhead conveyor system, comprising:

a plurality of carriages for suspending loads;

an overhead powered conveyor for suspending said carriages and transporting said carriages serially along at least one conveying path;

a stationary frame extending along said conveying path;

said overhead powered conveyor having at least one drive having a rotational power output;

said overhead powered conveyor having first and second drive shafts with spaced apart aligned distal ends and extending alone said conveying path;

each of said drive shafts being mounted to said stationary frame for rotation about respective shaft axes parallel to respective portions of said conveying path;

said overhead powered conveyor having a power connection between said drive and said drive shafts for rotatably driving said drive shafts about said shaft axes;

said carriages each having a driven member and said driven member engaging an engagement portion of said drive shafts with sufficient traction so as to form a helical loci of engagement about the periphery of said drive shafts during rotation of said drive shafts about said shaft axis to power said carriage along the conveying path in a direction of the conveying path dependent upon a direction of rotation of said drive shafts;

said carriages suspending the loads vertically below said drive shafts;

wherein the mounting of each of said drive shafts to said stationary frame includes two rigid aligned load beams extending along the conveying path and being fixedly connected to said stationary frame, and a plurality of bearings mounted on said load beams rotatably supporting each of said drive shafts;

said load beams having spaced apart, aligned and adjacent distal ends respectively adjacent to the distal ends of said drive shafts;

said power connection including a drive shaft coupling drivingly extending between said drive shaft distal ends and having opposed ends respectively being connected to said distal ends of said drive shafts; and a bracket mounting said drive, said bracket extending between and being connected to said distal ends of said load beams below and adjacent to said drive shaft coupling, said bracket forming the sole support for said drive and said bracket being solely supported by the distal ends of said load beams.

25. A system according to claim 24, wherein said power connection has a flexible endless link;

wherein said bracket includes a lost motion adjustable connection with said drive for adjusting tension within said link; and said bracket including a threaded member threadingly movable against said drive in a direction perpendicular to the conveying path for said adjusting.

26. A system according to claim 24, wherein said bracket forms the sole support for said drive and said bracket being solely supported by the distal ends of said load beams;

at least one bearing rotatably mounting said drive shaft coupling on said bracket; and said drive shaft coupling, at least one si bearing, said bracket, said drive, and said power connection form a preassembled drive unit that is fully preassembled independently of said drive shafts and said load beams as a module drive unit.

27. A system according to claim 26; wherein said drive shaft coupling is centrally split into two identical, mirror when assembled, coupling parts aligned with each other in the direction of said conveying path;

said drive shaft coupling including a releasable fastener joining said coupling parts together so that said coupling parts may be disassembled and moved from said drive shafts without axially moving said drive shafts;

said bracket being releasably connected to said load beam so that said bracket may be removed from between said load beams without moving said load beams; and said modular drive unit as an entirety can be unfastened, removed and replaced without moving or disassembling said drive shafts and said load beams.

28. A system according to claim 26, wherein said power connection includes two spaced apart pulleys on said drive shaft coupling for driving said drive shaft coupling and in turn driving said drive shafts;

said power connection further having two pulleys respectively on opposite sides of said drive and each connected to said power output, and two endless flexible links extending between said pulleys respectively on said drive and said drive shaft coupling;

wherein there are two bearings rotatably supporting said drive shaft coupling on said bracket and being spaced apart in the direction of said conveying path; and said bracket having spaced apart apertures respectively passing therethrough said flexible endless links.

29. A system according to claim 28, wherein said drive shaft coupling is centrally split into two identical, mirror images when assembled, coupling parts aligned with each other in the direction of said conveying path;

said drive shaft coupling including a releasable fastener joining said coupling parts together so that said coupling parts may be disassembled and moved from said drive shafts without axially moving said drive shafts;

said bracket being releasably connected to said load beam so that said bracket may be removed from between said load beams without moving said load beams; and said modular drive unit as an entirety can be unfastened, removed and replaced without moving or disassembling said drive shafts and said load beams.

\* \* \* \* \*